No. 670,824. Patented Mar. 26, 1901.
L. E. THOMPSON.
VEHICLE WHEEL.
(Application filed Mar. 2, 1900.)
(No Model.)
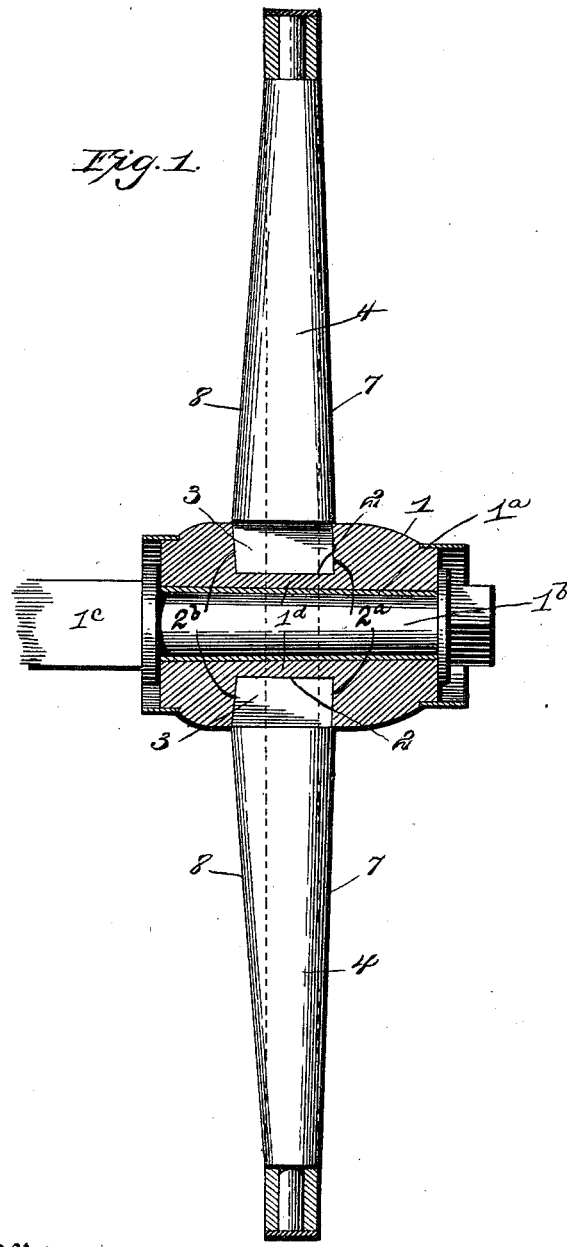
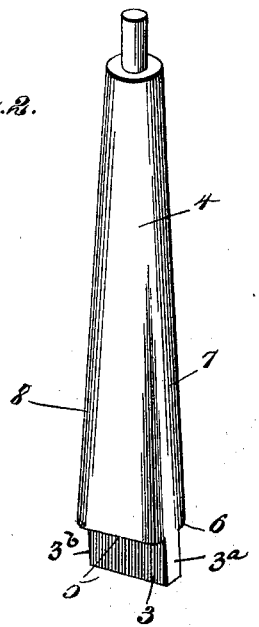
Witnesses
Louis D. Heinrichs
B. F. Funk
Inventor
Lewis E. Thompson
By Victor J. Evans
Attorney

UNITED STATES PATENT OFFICE.

LEWIS E. THOMPSON, OF McKINLEY, IOWA.

VEHICLE-WHEEL.

SPECIFICATION forming part of Letters Patent No. 670,824, dated March 26, 1901.

Application filed March 2, 1900. Serial No. 7,120. (No model.)

*To all whom it may concern:*

Be it known that I, LEWIS E. THOMPSON, a citizen of the United States, residing at McKinley, in the county of Adair and State of Iowa, have invented certain new and useful Improvements in Vehicle-Wheels, of which the following is a specification.

This invention is an improvement in spoke-sockets and spokes for vehicle-wheels; and its object is to so construct the parts that greater strength will be imparted to wheels embodying this invention.

With this object in view the invention resides in providing a hub with a rectangular socket of greater width than those usually employed having a slight incline at its outer end and a greater incline at its inner end, a spoke with a tenon of greater width than those usually employed in articles of this character having a slight incline at its front end and a greater incline at its rear end, and in providing the spoke-body with a slightly-inclined straight side and the opposite side being straight and inclined at a greater angle to the longitudinal center thereof, so that the strain on the wheel will be next to the inner side of the hub, the inner end of the spoke-body being rectangular in cross-section and inclined on all four sides to a round outer part.

Heretofore it has been found that when an abnormal load is supported by heavy wagons the spokes of the wheels thereof have a tendency to spring away from the hubs, and the wheels are then termed "dished." By the use of my invention the liability of this inconvenience is reduced to a minimum, inasmuch as the strain is properly proportioned on either side of the longitudinal center of the spokes, thus causing the wheel, of which they form the essential parts, to withstand the extra strain incidental to an abnormal weight.

The peculiar construction and arrangement of my invention will be fully described hereinafter, recited in the claim, and illustrated in the accompanying drawings, in which—

Figure 1 is a section through a wheel constructed in accordance with my invention, and Fig. 2 is a detail perspective view of a spoke.

In carrying out my invention I provide a hub 1 of the standard construction containing a sleeve or box $1^a$, which surrounds the spindle $1^b$ of an axle $1^c$. A series of spoke sockets or mortises 2 are cut from said hub and extend nearly the entire thickness thereof, so as to receive the extra wide tenons 3 of the spoke 4. The spoke-sockets are formed with slightly-inclined outer ends and greater inclined inner ends. These tenons have slight inclines $3^a$ at their front ends and greater inclines $3^b$ at their rear ends and have parallel sides and are slightly narrower than the spoke proper, so as to provide shoulders 5 and 6, abutting against the outer wall of said hub, whereby greater strength is provided. The spoke sockets or mortises are not cut entirely through the hub, but only to a certain depth, so as to leave integral parts $1^d$ of the hub between the spoke sockets or mortises and the sleeve or box.

It will be noticed that this spoke is comparatively flat from its tenon end to about midway between its ends. From this point to the end designed to enter the felly it is round. In constructing the spoke in this manner I provide a straight side 7, slightly inclined, which in practice will face the outside of the wheel, while the other side of the spoke is inclined at a greater angle, as at 8, from a point intermediate its ends to the tenon end. By this construction, the side 8 being at a greater angle and inside of the wheel, the strain is distributed on each side of the longitudinal center of the spoke and tire, so as to equalize the strain and thereby remove the liability of the wheel becoming dished. It will thus be seen that while the weight of the wheel is not materially increased greater strength is provided, as well as a wheel which will remain "true" and which will "track" properly.

Having thus fully described my invention, what I claim, and desire to secure by Letters Patent, is—

A vehicle-wheel comprising a sleeve, a hub in which the sleeve is contained, formed with a series of radial spoke-sockets, leaving integral parts between the sockets and the sleeve, each socket having a slight incline at its outer end, a greater incline at its inner end and parallel sides, and a series of spokes, seating on the integral parts of the hub, each spoke having side shoulders, a rectangular tenon formed with a slight incline at its outer end, a greater incline at its inner end and parallel sides, and a body formed with a slight incline at its front side and a greater incline at its rear side, the inner part of the body being of rectangular shape in cross-section and extending into a rounded outer part.

In testimony whereof I affix my signature in presence of two witnesses.

LEWIS E. THOMPSON.

Witnesses:
H. F. HODGES,
I. M. BAULTINGHOUSE.